United States Patent
Ho

(10) Patent No.: US 8,282,043 B2
(45) Date of Patent: Oct. 9, 2012

(54) SIMULTANEOUS MOMENTUM DUMPING AND ORBIT CONTROL

(75) Inventor: Yiu-Hung M. Ho, Palos Verdes Estates, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/033,170

(22) Filed: Feb. 23, 2011

(65) Prior Publication Data

US 2011/0144835 A1 Jun. 16, 2011

Related U.S. Application Data

(62) Division of application No. 11/778,909, filed on Jul. 17, 2007, now Pat. No. 7,918,420.

(51) Int. Cl.
*B64G 1/10* (2006.01)
*B64G 1/26* (2006.01)

(52) U.S. Cl. .................................... 244/158.8; 244/169

(58) Field of Classification Search ................ 244/169, 244/158.8, 170, 164, 171, 171.1, 171.2; 701/13
See application file for complete search history.

(56) References Cited

U.S. PATENT DOCUMENTS

| | | | |
|---|---|---|---|
| 4,635,885 A * | 1/1987 | Hujsak | 244/169 |
| 4,767,084 A | 8/1988 | Chan et al. | |
| 5,284,309 A * | 2/1994 | Salvatore et al. | 244/135 C |
| 5,310,143 A * | 5/1994 | Yocum et al. | 244/164 |
| 5,443,231 A | 8/1995 | Anzel | |
| 5,806,804 A * | 9/1998 | Goodzeit et al. | 244/169 |
| 5,810,295 A | 9/1998 | Anzel | |
| 5,984,236 A | 11/1999 | Keitel et al. | |
| 6,015,116 A | 1/2000 | Anzel | |
| 6,042,058 A | 3/2000 | Anzel | |
| 6,340,138 B1 | 1/2002 | Barsky et al. | |
| 6,435,457 B1 | 8/2002 | Anzel | |
| 6,439,507 B1 | 8/2002 | Reekdahl et al. | |
| 2009/0020650 A1 | 1/2009 | Ho | |
| 2009/0078829 A1 | 3/2009 | Ho et al. | |

OTHER PUBLICATIONS

USPTO Office Action for U.S. Appl. No. 11/778,909 dated May 26, 2010.
USPTO Notice of Allowance for U.S. Appl. No. 11/778,909 dated Dec. 10, 2010.

* cited by examiner

*Primary Examiner* — Tien Dinh
(74) *Attorney, Agent, or Firm* — Yee & Associates, P.C.

(57) ABSTRACT

The present system and methods enable simultaneous momentum dumping and orbit control of a spacecraft, such as a geostationary satellite. Control equations according to the present system and methods generate accurate station-keeping commands quickly and efficiently, reducing the number of maneuvers needed to maintain station and allowing station-keeping maneuvers to be performed with a single burn. Additional benefits include increased efficiency in propellant usage, and extension of the satellite's lifespan. The present system and methods also enable tighter orbit control, reduction in transients and number of station-keeping thrusters aboard the satellite. The present methods also eliminate the need for the thrusters to point through the center of mass of the satellite, which in turn reduces the need for dedicated station-keeping thrusters. The present methods also facilitate completely autonomous orbit control and control using Attitude Control Systems (ACS).

16 Claims, 1 Drawing Sheet

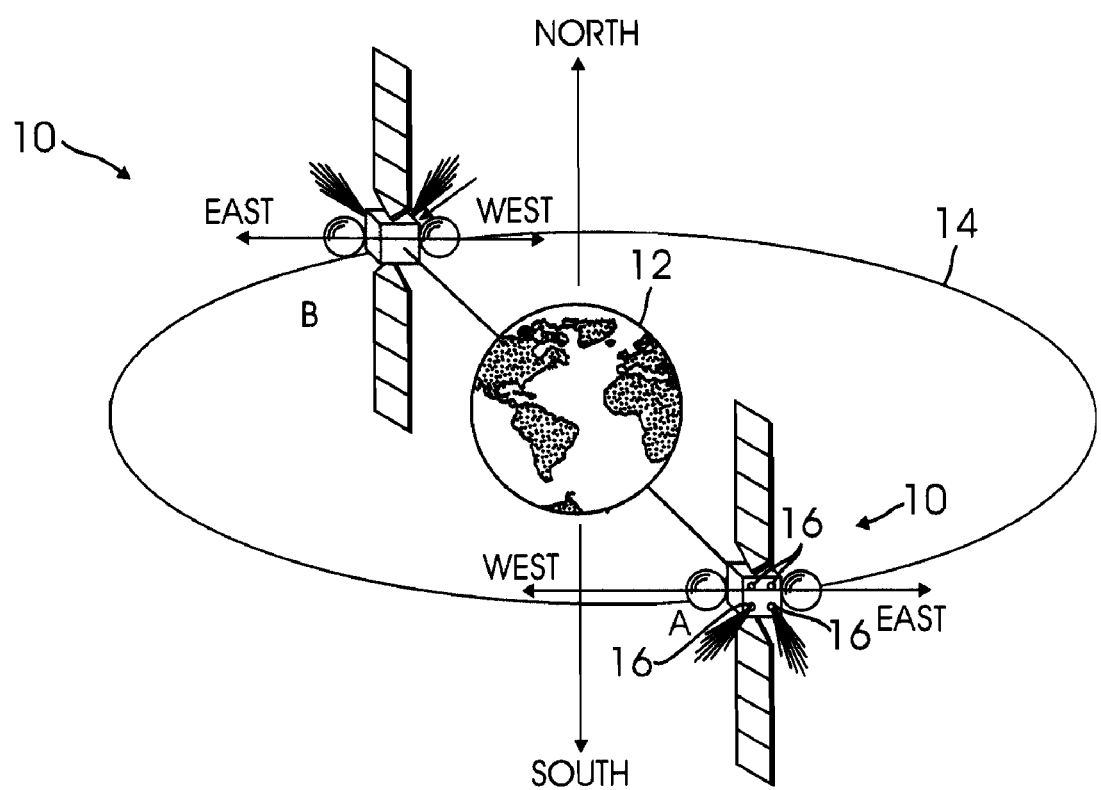

SIMULTANEOUS MOMENTUM DUMPING AND ORBIT CONTROL

This application is a divisional application of and claims priority to U.S. application Ser. No. 11/778,909, filed Jul. 17, 2007, now U.S. Pat. No. 7,918,420. This application is related to U.S. application Ser. No. 12/141,832, which is a continuation in part of U.S. application Ser. No. 11/788,909, filed Jul. 17, 2007, now U.S. Pat. No. 7,918,420.

BACKGROUND

1. Technical Field

The present disclosure relates to station-keeping for synchronous satellites.

2. Description of Related Art

With reference to FIG. 1, a synchronous satellite 10 orbits the Earth 12 at a rate that matches the Earth's rate of revolution, so that the satellite 10 remains above a fixed point on the Earth 12. FIG. 1 illustrates the satellite 10 at two different points A, B along its orbit path 14. Synchronous satellites are also referred to as geostationary satellites, because they operate within a stationary orbit. Synchronous satellites are used for many applications including weather and communications.

Various forces act on synchronous satellites to perturb their stationary orbits. Examples include the gravitational effects of the sun and the moon, the elliptical shape of the Earth and solar radiation pressure. To counter these forces, synchronous satellites are equipped with propulsion systems that are fired at intervals to maintain station in a desired orbit. For example, the satellite 10 illustrated in FIG. 1 includes a plurality of thrusters 16.

The process of maintaining station, also known as "station-keeping", requires control of the drift, inclination and eccentricity of the satellite. With reference to FIG. 1, drift is the east-west position of the satellite 10 relative to a sub-satellite point on the Earth 12. Inclination is the north-south position of the satellite 10 relative to the Earth's equator. Eccentricity is the measure of the non-circularity of the satellite orbit 14, or the measure of the variation in the distance between the satellite 10 and the Earth 12 as the satellite 10 orbits the Earth 12. Satellite positioning and orientation is typically controlled from Earth. A control center monitors the satellite's trajectory and issues periodic commands to the satellite to correct orbit perturbations. Typically, orbit control is performed once every two weeks, and momentum dumping is performed every day or every other day.

Current satellites are either spin-stabilized or three-axis stabilized satellites. Spin-stabilized satellites use the gyroscopic effect of the satellite spinning to help maintain the satellite orbit. For certain applications, however, the size of the satellite militates in favor of a three-axis stabilization scheme. Some current three-axis stabilized satellites use separate sets of thrusters to control north-south and east-west motions. The thrusters may burn a chemical propellant or produce an ion discharge, for example, to produce thrust. Alternatively, the thrusters may comprise any apparatus configured to produce a velocity change in the satellite. The north-south thrusters produce the required north-south change in satellite velocity, or $\Delta V$, to control orbit inclination. The east-west thrusters produce the required combined east-west $\Delta V$ to control drift and eccentricity. As the cost of satellite propulsion systems is directly related to the number of thrusters required for station keeping, it is advantageous to reduce the number of thrusters required for satellite propulsion and station keeping. Further, propulsion systems have limited lifespans because of the limited supply of fuel onboard the satellite. Thus, it is also advantageous to reduce fuel consumption by onboard thrusters so as to extend the usable life of the satellite.

SUMMARY

The embodiments of the present system and methods for simultaneous momentum dumping and orbit control have several features, no single one of which is solely responsible for their desirable attributes. Without limiting the scope of this system and these methods as expressed by the claims that follow, their more prominent features will now be discussed briefly. After considering this discussion, and particularly after reading the section entitled "Detailed Description", one will understand how the features of the present embodiments provide advantages, which include a reduction in the number of maneuvers needed to maintain station, increased efficiency in propellant usage, reduction in transients, tighter orbit control, which has the added benefit of reducing the antenna pointing budget, a reduction in the number of station-keeping thrusters needed aboard the satellite, elimination of any need for the thrusters to point through the center of mass of the satellite, thus reducing the need for dedicated station-keeping thrusters, and the potential to enable completely autonomous orbit and ACS control.

One embodiment of the present methods of simultaneous orbit control and momentum dumping in a spacecraft, the spacecraft including a plurality of thrusters, comprises the steps of: generating a set of firing commands for the thrusters from solutions to momentum dumping and inclination control equations; and firing the thrusters according to the firing commands. The momentum dumping and inclination control equations are defined as $$\sqrt{\Delta P_{K_2}^2 + \Delta P_{H_2}^2} = \Delta P_I$$

$$\lambda_{Inclination} = a\tan2\left(\frac{\Delta P_{H_2}}{\Delta P_I}, \frac{\Delta P_{K_2}}{\Delta P_I}\right)$$

$$\Delta \vec{H}_{ECI} = C_{Orbit\ to\ ECI} \Delta \vec{H}$$

$$\Delta \vec{H} = \sum_i \vec{r}_i \otimes \vec{f}_i \Delta t_i$$

$$\sum_i f_i^{normal} \Delta t_i = \Delta P_I;$$

where $\Delta \vec{H}$=momentum dumping requirement (vector) in orbit frame $\Delta \vec{H}_{ECI}$=momentum dumping requirement (vector) in Earth—Centered Inertial frame $\Delta P_{K_2}$=spacecraft mass×minimum delta velocity required to control mean $K_2$ $\Delta P_{H_2}$=spacecraft mass×minimum delta velocity required to control mean $H_2$ $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $\lambda_{Inclination}$=location of the maneuver $C_{Orbit\ to\ ECI}$=transformation matrix from orbit to ECI frame, rotation matrix about the Z by $\lambda_{Inclination}$ $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i = \begin{bmatrix} f_i^{tangential} \\ f_i^{radial} \\ f_i^{normal} \end{bmatrix}.$$

Another embodiment of the present methods of simultaneous orbit control and momentum dumping in a spacecraft, the spacecraft including a plurality of thrusters, comprises the steps of: generating a set of firing commands for the thrusters from solutions to momentum dumping and drift control equations; and firing the thrusters according to the firing commands. The momentum dumping and drift control equations are defined as $$\Delta \vec{H} = \sum_i \vec{r}_i \otimes \vec{f}_i \Delta t_i$$

$$\sum_i f_i^{tangential} \Delta t_i = \Delta P_{Drift};$$

where $\Delta \vec{H}$=momentum dumping requirement (vector) in orbit frame $\Delta P_{Drift}$=spacecraft mass×minimum delta velocity required to control mean Drift $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $C_{Orbit\ to\ ECI}$=transformation matrix from orbit to ECI frame $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i = \begin{bmatrix} f_i^{tangential} \\ f_i^{radial} \\ f_i^{normal} \end{bmatrix}.$$

Another embodiment of the present methods simultaneous orbit control and momentum dumping in a spacecraft, the spacecraft including a plurality of thrusters, comprises the steps of: generating a set of firing commands for the thrusters from solutions to momentum dumping/drift and eccentricity control equations; and firing the thrusters according to the firing commands. The momentum dumping/drift and eccentricity control equations are defined as $$P^{tangential} = \sum_i f_i^{tangential} \Delta t_i$$

$$P^{radial} = \sum_i f_i^{radial} \Delta t_i$$

-continued $$\lambda_{Eccentricity} = \tan^{-1}\left(\frac{2P^{tangential}\Delta P_{H_1} + P^{radial}\Delta V_{K_1}}{2P^{tangential}\Delta P_{K_1} - P^{radial}\Delta V_{H_1}}\right)$$

$$\Delta \vec{H}_{ECI} = C_{Orbit\ to\ ECI} \Delta \vec{H}$$

$$\Delta \vec{H} = \sum_i \vec{r}_i \otimes \vec{f}_i \Delta t_i$$

$$\sum_i f_i^{tangential} \Delta t_i = \Delta P_{Drift};$$

where $\Delta \vec{H}$=momentum dumping requirement (vector) in orbit frame $\Delta \vec{H}_{ECI}$=momentum dumping requirement (vector) in Earth—Centered Inertial frame $\Delta P_{K_1}$=spacecraft mass×minimum delta velocity required to control mean $K_1$ $\Delta P_{H_1}$=spacecraft mass×minimum delta velocity required to control mean $H_1$ $\Delta P_{Drift}$=spacecraft mass×minimum delta velocity required to control mean Drift $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $\lambda_{Eccentricity}$=location of the maneuver $C_{Orbit\ to\ ECI}$=transformation matrix from orbit to ECI frame, rotation matrix about the Z by $\lambda_{Eccentricity}$ $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i = \begin{bmatrix} f_i^{tangential} \\ f_i^{radial} \\ f_i^{normal} \end{bmatrix}.$$

Another embodiment of the present methods simultaneous orbit control and momentum dumping in a spacecraft, the spacecraft including a plurality of thrusters, comprises the steps of: generating a set of firing commands for the thrusters from solutions to momentum dumping/drift and eccentricity control equations; and firing the thrusters according to the firing commands. The momentum dumping/drift and eccentricity control equations are defined as $$\sum_{j=1,2} P_j^{tangential} = \Delta P_{drift}$$

$$(2P_1^{tangential}\cos\lambda_1 + P_1^{radial}\sin\lambda_1) +$$
$$(2P_2^{tangential}\cos(\lambda_1 - \Delta\lambda) + P_2^{radial}\sin(\lambda_1 - \Delta\lambda)) = \Delta P_{K_1}$$

$$(2P_1^{tangential}\sin\lambda_1 - P_1^{radial}\cos\lambda_1) +$$
$$(2P_2^{tangential}\sin(\lambda_1 - \Delta\lambda) - P_2^{radial}\cos(\lambda_1 - \Delta\lambda)) = \Delta P_{H_1}$$

$$-2P_1^{radial}P_2^{radial}\sin\Delta\lambda - 4P_1^{tangential}P_2^{radial}\cos\Delta\lambda -$$
$$8P_1^{tangential}P_2^{tangential}\sin\Delta\lambda + 4P_1^{radial}P_2^{tangential}\cos\Delta\lambda = 0$$

-continued $$\lambda_2 = \lambda_1 - \Delta\lambda$$

$$\Delta\vec{H}_{ECI} = \Delta\vec{H}_{ECI,1} + \Delta\vec{H}_{ECI,2}$$

$$\Delta\vec{H}_{ECI,1} = C_{Orbit\ to\ ECI}(\lambda_1)\Delta\vec{H}_1$$

$$\Delta\vec{H}_{ECI,2} = C_{Orbit\ to\ ECI}(\lambda_2)\Delta\vec{H}_2$$

$$P_j^{radial} = \sum_i f_{i,j}^{radial} \Delta t_{i,j}$$

$$P_j^{tangential} = \sum_i f_{i,j}^{tangential} \Delta t_{i,j}$$

$$\Delta\vec{H}_j = \sum_i \vec{r}_{i,j} \otimes \vec{f}_{i,j} \Delta t_{i,j};$$

where $$\vec{r}_{i,j} = C_{Body\ to\ Orbit} \vec{R}_{i,j}$$

$$\vec{f}_{i,j} = C_{Body\ to\ Orbit} \vec{F}_{i,j} = \begin{bmatrix} f_{i,j}^{tangential} \\ f_{i,j}^{radial} \\ f_{i,j}^{normal} \end{bmatrix}$$

$j = 1, 2$ $i$ = index for the $i^{th}$ thruster.

One embodiment of the present system for simultaneous orbit control and momentum dumping of a spacecraft comprises a spacecraft including a plurality of thrusters, and means for generating a set of firing commands for the thrusters from solutions to momentum dumping and inclination control equations. The momentum dumping and inclination control equations are defined as $$\sqrt{\Delta P_{K_2}^2 + \Delta P_{H_2}^2} = \Delta P_I$$

$$\lambda_{Inclination} = a\tan 2\left(\frac{\Delta P_{H_2}}{\Delta P_I}, \frac{\Delta P_{K_2}}{\Delta P_I}\right)$$

$$\Delta\vec{H}_{ECI} = C_{Orbit\ to\ ECI}\Delta\vec{H}$$

$$\Delta\vec{H} = \sum_i \vec{r}_i \otimes \vec{f}_i \Delta t_i$$

$$\sum_i f_i^{normal} \Delta t_i = \Delta P_I;$$

where $\Delta\vec{H}$=momentum dumping requirement (vector) in orbit frame $\Delta\vec{H}_{ECI}$=momentum dumping requirement (vector) in Earth—Centered Inertial frame $\Delta P_{K_2}$=spacecraft mass×minimum delta velocity required to control mean $K_2$ $\Delta P_{H_2}$=spacecraft mass×minimum delta velocity required to control mean $H_2$ $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $\lambda_{Inclination}$=location of the maneuver $C_{Orbit\ to\ ECI}$=transformation matrix from orbit to ECI frame, rotation matrix about the Z by $\lambda_{Inclination}$ $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i = \begin{bmatrix} f_i^{tangential} \\ f_i^{radial} \\ f_i^{normal} \end{bmatrix}.$$

Another embodiment of the present system for simultaneous orbit control and momentum dumping of a spacecraft comprises a spacecraft configured to orbit Earth in a geostationary orbit, and further configured to autonomously control a position of the spacecraft relative to a fixed point on Earth. The spacecraft further comprises a spacecraft body and a plurality of thrusters associated with the spacecraft body. The spacecraft generates a set of firing commands for the thrusters from solutions to momentum dumping and inclination control equations, and the spacecraft fires the thrusters according to the firing commands. The momentum dumping and inclination control equations are defined as $$\sqrt{\Delta P_{K_2}^2 + \Delta P_{H_2}^2} = \Delta P_I$$

$$\lambda_{Inclination} = a\tan 2\left(\frac{\Delta P_{H_2}}{\Delta P_I}, \frac{\Delta P_{K_2}}{\Delta P_I}\right)$$

$$\Delta\vec{H}_{ECI} = C_{Orbit\ to\ ECI}\Delta\vec{H}$$

$$\Delta\vec{H} = \sum_i \vec{r}_i \otimes \vec{f}_i \Delta t_i$$

$$\sum_i f_i^{normal} \Delta t_i = \Delta P_I;$$

where $\Delta\vec{H}$=momentum dumping requirement (vector) in orbit frame $\Delta\vec{H}_{ECI}$=momentum dumping requirement (vector) in Earth—Centered Inertial frame $\Delta P_{K_2}$=spacecraft mass×minimum delta velocity required to control mean $K_2$ $\Delta P_{H_2}$=spacecraft mass×minimum delta velocity required to control mean $H_2$ $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $\lambda_{Inclination}$=location of the maneuver $C_{Orbit\ to\ ECI}$=transformation matrix from orbit to ECI frame, rotation matrix about the Z by $\lambda_{Inclination}$ $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit}\vec{F}_i = \begin{bmatrix} f_i^{tangential} \\ f_i^{radial} \\ f_i^{normal} \end{bmatrix}.$$

The features, functions, and advantages of the present embodiments can be achieved independently in various embodiments or may be combined in yet other embodiments.

BRIEF DESCRIPTION OF THE DRAWINGS

The embodiments of the present system and methods for simultaneous momentum dumping and orbit control will now be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts:

FIG. 1 is a front perspective view of a geostationary satellite orbiting the Earth.

DETAILED DESCRIPTION

In describing the present embodiments, the following symbols will be used:

Eccentricity(e) vector:
$\Sigma = \Omega + \tan^{-1}(\tan(\omega)\cos(i))$
$h_1 = e \sin(\Sigma)$
$k_1 = e \cos(\Sigma)$
Inclination(i) vector:
$h_2 = \sin(i) \sin \Omega$.
$k_2 = \sin(i) \cos \Omega$.
$\Omega$ = right ascension of ascending node
$\omega$ = argument of perigee
$I = i$ = inclination of the orbit $$\text{mean drift rate} = \left[\frac{2\pi}{Period_{Nominal}}\sqrt{\frac{a^3}{\mu}} - 1\right]$$

a = semi-major axis
$Period_{Normal}$ = nominal orbital period of the desired orbit
$V_{synchronous}$ = orbital velocity at geosynchronous orbit
$R_{synchronous}$ = distance from center of the Earth at geosynchronous orbit
$\Delta V_i$ = magnitude of the delta velocity for $i^{th}$ maneuver
$t_i$ = direction cosine of $\Delta V_i$ along orbit tangential direction
$n_i$ = direction cosine of $\Delta V_i$ along orbit normal direction
$r_i$ = direction cosine of $\Delta V_i$ along orbit radial direction
$\lambda_i$ = applied delta velocity right ascension
$\Delta V_{lon}$ = minimum delta velocity required for change of argument of latitude (*mean longitude)
$\Delta V_{drift}$ = minimum delta velocity required to control mean semi-major axis (*longitudinal drift)
$\Delta V_{K_1}$ = minimum delta velocity required to control mean $K_1$
$\Delta V_{H_1}$ = minimum delta velocity required to control mean $H_1$
$\Delta V_{K_2}$ = minimum delta velocity required to control mean $K_2$
$\Delta V_{H_2}$ = minimum delta velocity required to control mean $H_2$
*For geosynchronous orbit To control orbit, the size(s) ($\Delta V$) and location(s) ($\lambda$) of the maneuver(s) that can correct the orbit must be found. The basic control equations for drift and eccentricity control are:

$$\sum_{i=1,2} \Delta V_i t_i = \Delta V_{drift}$$

$$\sum_{i=1,2} \Delta V_i (2 t_i \cos\lambda_i + r_i \sin\lambda_i) = \Delta V_{K_1}$$

$$\sum_{i=1,2} \Delta V_i (2 t_i \sin\lambda_i - r_i \cos\lambda_i) = \Delta V_{H_1}$$

And the basic control equations for inclination control are:
$\Delta V_3 n_3 \cos \lambda_3 = \Delta V_{K_2}$
$\Delta V_3 n_3 \sin \lambda_3 = \Delta V_{H_2}$ Under some circumstances, a set of three burns may be used to control the longitudinal drift rate, eccentricity [$K_1$ $H_1$], and inclination [$K_2$ $H_2$] for a satellite in near geo-stationary orbit. From the equations and symbols above, then:

$$\sum_{i=1,3} \Delta V_i t_i = \Delta V_{lon}$$

$$\sum_{i=1,3} \Delta V_i t_i = \Delta V_{drift}$$

$$\sum_{i=1,3} \Delta V_i (2 t_i \cos\lambda_i + r_i \sin\lambda_i) = \Delta V_{K_1}$$

$$\sum_{i=1,3} \Delta V_i (2 t_i \sin\lambda_i - r_i \cos\lambda_i) = \Delta V_{H_1}$$

$$\sum_{i=1,3} \Delta V_i n_i \cos\lambda_i = \Delta V_{K_2}$$

$$\sum_{i=1,3} \Delta V_i n_i \sin\lambda_i = \Delta V_{H_2}$$

Under some circumstances, however, the longitude equation above may not be used. For example, after orbit initialization the satellite is at the nominal longitude location. Then only the longitudinal drift may need to be corrected in order to keep the longitude error to within a desired range, such as, for example ±0.05°. Therefore, the remaining five equations form the basis for the maneuver calculation. In some situations these equations cannot be solved analytically. However, careful choices regarding, for example, thruster locations and orientations and satellite configurations can simplify their solutions.

Propellant consumption is sometimes the primary concern for chemical propulsion systems. Therefore, station-keeping thrusters may be configured specifically either for north/south (inclination control) or east/west (drift and eccentricity control) maneuvers with minimal unwanted components. Under these conditions the set of equations above becomes:

$$\sum_{i=1,2} \Delta V_i t_i = \Delta V_{drift}$$

$$\sum_{i=1,2} \Delta V_i (2 t_i \cos\lambda_i + r_i \sin\lambda_i) = \Delta V_{K_1}$$

$$\sum_{i=1,2} \Delta V_i (2 t_i \sin\lambda_i - r_i \cos\lambda_i) = \Delta V_{H_1}$$

$\Delta V_3 n_3 \cos\lambda_3 = \Delta V_{K_2}$ $\Delta V_3 n_3 \sin\lambda_3 = \Delta V_{H_2}$ with the first three equations above controlling drift and eccentricity and the last two equations controlling inclination.

For maneuver planning, the size(s) ($\Delta V$) and location(s) ($\lambda$) of the burn(s) that can correct the orbit according to the selected control strategy must be found. For a given $\Delta V_{drift}$ and $[\Delta V_{K1} \; \Delta V_{H1}]$, one can solve for the two sets of $\Delta V$'s and $\lambda$'s analytically by reformulating the equations for drift and eccentricity control:

$$\sum_{i=1,2} \Delta V_i t_i = \Delta V_{drift}$$

$$\Delta V_1(2t_1 \cos\lambda_1 + r_1 \sin\lambda_1) +$$
$$\Delta V_2(2t_2 \cos(\lambda_1 - \Delta\lambda) + r_2 \sin(\lambda_1 - \Delta\lambda)) = \Delta V_{K_1}$$

$$\Delta V_1(2t_1 \sin\lambda_1 - r_1 \cos\lambda_1) + \Delta V_2(2t_2 \sin(\lambda_1 - \Delta\lambda) + r_2 \cos(\lambda_1 - \Delta\lambda)) = \Delta V_{H_1}$$

$$-2\Delta V_1 r_1 \Delta V_2 r_2 \sin\Delta\lambda - 4\Delta V_1 t_1 \Delta V_2 r_2 \cos\Delta\lambda -$$
$$8\Delta V_1 t_1 \Delta V_2 t_2 \sin\Delta\lambda + 4\Delta V_1 r_1 \Delta V_2 t_2 \cos\Delta\lambda = 0$$

where $\lambda_2 = \lambda_1 - \Delta\lambda$

In the equations above there are four possible solutions for $\Delta V_1$, $\Delta V_2$, $\lambda_1$ and $\Delta\lambda$:

$$\Delta V_1 = \begin{cases} \sqrt{B}\left(\dfrac{16\dfrac{\Delta V_{drift} t_1^2 t_2^2}{\sqrt{AB}} + 4\dfrac{\Delta V_{drift} t_1^2 r_2^2}{\sqrt{AB}} +}{\dfrac{\Delta V_{drift} r_1^2 r_2^2}{\sqrt{AB}} + 4\dfrac{\Delta V_{drift} t_2^2 r_1^2}{\sqrt{AB}} - t_2}\right) \bigg/ \\ \qquad (4t_2^2 + r_1^2)\left(4\dfrac{t_2^2 t_1}{\sqrt{A}} + \dfrac{t_1 r_2^2}{\sqrt{A}} - t_2\right) \\[4pt] \sqrt{B}\left(\dfrac{16\dfrac{\Delta V_{drift} t_1^2 t_2^2}{\sqrt{AB}} + 4\dfrac{\Delta V_{drift} t_1^2 r_2^2}{\sqrt{AB}} +}{\dfrac{\Delta V_{drift} r_1^2 r_2^2}{\sqrt{AB}} + 4\dfrac{\Delta V_{drift} t_2^2 r_1^2}{\sqrt{AB}} + t_2}\right) \bigg/ \\ \qquad (4t_2^2 + r_1^2)\left(4\dfrac{t_2^2 t_1}{\sqrt{A}} + \dfrac{t_1 r_2^2}{\sqrt{A}} - t_2\right) \\[4pt] \sqrt{B}\left(\dfrac{16\dfrac{\Delta V_{drift} t_1^2 t_2^2}{\sqrt{AB}} + 4\dfrac{\Delta V_{drift} t_1^2 r_2^2}{\sqrt{AB}} +}{\dfrac{\Delta V_{drift} r_1^2 r_2^2}{\sqrt{AB}} + 4\dfrac{\Delta V_{drift} t_2^2 r_1^2}{\sqrt{AB}} - t_2}\right) \bigg/ \\ \qquad (4t_2^2 + r_1^2)\left(4\dfrac{t_2^2 t_1}{\sqrt{A}} + \dfrac{t_1 r_2^2}{\sqrt{A}} + t_2\right) \end{cases}$$

$$A = 4t_1^2 r_2^2 + 4r_1^2 t_2^2 + r_1^2 r_2^2 + 16 t_1^2 t_2^2$$
$$B = 4t_1^2 \Delta V_{H_1}^2 + 4t_1^2 \Delta V_{K_1}^2 + r_1^2 \Delta V_{K_1}^2 + r_1^2 \Delta V_{H_1}^2$$

-continued $$\Delta V_2 = \begin{cases} -\Delta V_{drift}(4\Delta V_{drift} t_1^2 + r_1^2 + t_1\sqrt{B})\big/ \\ \qquad (4t_2^2 + r_1^2)\left(4\dfrac{t_2^2 t_1}{\sqrt{A}} + \dfrac{t_1 r_2^2}{\sqrt{A}} - t_2\right) \\[4pt] -\Delta V_{drift}(4\Delta V_{drift} t_1^2 + r_1^2 + t_1\sqrt{B})\big/ \\ \qquad (4t_2^2 + r_1^2)\left(4\dfrac{t_2^2 t_1}{\sqrt{A}} + \dfrac{t_1 r_2^2}{\sqrt{A}} - t_2\right) \\[4pt] \Delta V_{drift}(4\Delta V_{drift} t_1^2 + r_1^2 - t_1\sqrt{B})\big/ \\ \qquad (4t_2^2 + r_1^2)\left(4\dfrac{t_2^2 t_1}{\sqrt{A}} + \dfrac{t_1 r_2^2}{\sqrt{A}} + t_2\right) \\[4pt] \Delta V_{drift}(4\Delta V_{drift} t_1^2 + r_1^2 + t_1\sqrt{B})\big/ \\ \qquad (4t_2^2 + r_1^2)\left(4\dfrac{t_2^2 t_1}{\sqrt{A}} + \dfrac{t_1 r_2^2}{\sqrt{A}} + t_2\right) \end{cases}$$

$$A = 4t_1^2 r_2^2 + 4r_1^2 t_2^2 + r_1^2 r_2^2 + 16 t_1^2 t_2^2$$
$$B = 4t_1^2 \Delta V_{H_1}^2 + 4t_1^2 \Delta V_{K_1}^2 + r_1^2 \Delta V_{K_1}^2 + r_1^2 \Delta V_{H_1}^2$$

$$\lambda_1 = \begin{cases} a\tan2\left(\dfrac{r_1 \Delta V_{K_1} + 2t_1 \Delta V_{H_1}}{\sqrt{B}}, \dfrac{2t_1 \Delta V_{K_1} - r_1 \Delta V_{H_1}}{\sqrt{B}}\right) \\ a\tan2\left(-\dfrac{r_1 \Delta V_{K_1} + 2t_1 \Delta V_{H_1}}{\sqrt{B}}, \dfrac{2t_1 \Delta V_{K_1} - r_1 \Delta V_{H_1}}{\sqrt{B}}\right) \\ a\tan2\left(\dfrac{r_1 \Delta V_{K_1} + 2t_1 \Delta V_{H_1}}{\sqrt{B}}, \dfrac{2t_1 \Delta V_{K_1} - r_1 \Delta V_{H_1}}{\sqrt{B}}\right) \\ a\tan2\left(-\dfrac{r_1 \Delta V_{K_1} + 2t_1 \Delta V_{H_1}}{\sqrt{B}}, \dfrac{2t_1 \Delta V_{K_1} - r_1 \Delta V_{H_1}}{\sqrt{B}}\right) \end{cases}$$

$$\Delta\lambda = \begin{cases} a\tan2\left(\dfrac{2(t_2 r_1 - t_1 r_2)}{\sqrt{A}}, \dfrac{r_1 r_2 + 4t_1 t_2}{\sqrt{A}}\right) \\ a\tan2\left(\dfrac{2(t_2 r_1 - t_1 r_2)}{\sqrt{A}}, \dfrac{r_1 r_2 + 4t_1 t_2}{\sqrt{A}}\right) \\ a\tan2\left(-\dfrac{2(t_2 r_1 - t_1 r_2)}{\sqrt{A}}, \dfrac{r_1 r_2 + 4t_1 t_2}{\sqrt{A}}\right) \\ a\tan2\left(-\dfrac{2(t_2 r_1 - t_1 r_2)}{\sqrt{A}}, \dfrac{r_1 r_2 + 4t_1 t_2}{\sqrt{A}}\right) \end{cases}$$

The solution to the above equations that provides the minimum $\Delta V_1$ and $\Delta V_2$ is the most advantageous choice, since smaller velocity changes generally consume less fuel than larger velocity changes, and since smaller velocity changes have less potential to create unwanted disturbances in the satellite's orbit as compared to larger velocity changes. However, the solution becomes invalid if either $\Delta V_1$ or $\Delta V_2$ is less than zero, which occurs when the magnitude of $\Delta V_{drift}$ approaches the magnitude of $[\Delta N_{K1} \; \Delta V_{H1}]$. In these situations the formulation for one maneuver can be used, and one set of $\Delta V$ and $\lambda$ control both the drift and eccentricity:

$$\Delta V_1 = \frac{\Delta V_{drift}}{t_1}$$

$$\lambda_1 = \tan^{-1}\left(\frac{\Delta V_1 2t_1 \Delta V_{H_1} + \Delta V_1 r_1 \Delta V_{K_1}}{\Delta V_1 2t_1 \Delta V_{K_1} - \Delta V_1 r_1 \Delta V_{H_1}}\right)$$

According to the equations above, the size of the burn is dictated by the drift correction while the location of the burn is determined by the direction of the eccentricity correction $[\Delta V_{K1} \; \Delta V_{H1}]$ and the in-plane components of the thrust vector $[t_1\ r_1]$. Since $\Delta V_{drift}$ does not necessarily have the same magnitude as $[\Delta V_{K1}\ \Delta V_{H1}]$, the one maneuver solution may result in either under correction (undershoot) or over correction (overshoot) of the eccentricity perturbation. In such cases, the difference can be corrected in the next control cycle. For a given inclination correction $[\Delta V_{K2}\ \Delta V_{H2}]$, the solutions for $\Delta V$ and $\lambda$ are very simple:

$$\Delta V_I = \sqrt{\Delta V_{H_2}^2 + \Delta V_{K_2}^2}$$

$$\Delta V_3 = \frac{\Delta V_I}{n_3}$$

$$\lambda_3 = a\tan 2\left(\frac{\Delta V_{H_2}}{\Delta V_I}, \frac{\Delta V_{K_2}}{\Delta V_I}\right)$$

According to the present embodiments, it is possible to perform simultaneous momentum dumping and orbit control. Benefits achieved by the present embodiments include a reduction in the number of maneuvers needed to maintain station, increased efficiency in propellant usage, reduction in transients, tighter orbit control, which has the added benefit of reducing the antenna pointing budget, a reduction in the number of station-keeping thrusters needed aboard the satellite, elimination of any need for the thrusters to point through the center of mass of the satellite, thus reducing the need for dedicated station-keeping thrusters, and the potential to enable completely autonomous orbit and ACS control.

In the present embodiments, since the equations for orbit control are in the orbit frame, the momentum dumping requirement is computed in the same frame:

$\Delta \vec{H}$=momentum dumping requirement (vector) in orbit frame $\Delta \vec{H}_{ECI}$=momentum dumping requirement (vector) in Earth—Centered Inertial frame $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $C_{Orbit\ to\ ECI}$=transformation matrix from orbit to ECI frame, $C_{Body\ to\ Orbit}$=transformation matrix from spacecraft body to orbit frame $\vec{r}_i = C_{Body\ to\ Orbit} \vec{R}_i$ $\vec{f}_i = C_{Body\ to\ Orbit} \vec{F}$ $$\Delta \vec{H} = \sum_i \vec{r}_i \otimes \vec{f}_i \Delta t_i$$

$\Delta \vec{H}_{ECI} = C_{Orbit\ to\ ECI} \Delta \vec{H}$

Using the equation for impulse, $\vec{P}$(impulse)=

$\vec{f}$(thrust)$\Delta t$(ontime)=$M$(spacecraft_mass)$\Delta \vec{V}$(delta_velocity), the equations for momentum and orbit control can be reformulated into more convenient forms by multiplying the orbit control equations by the spacecraft mass, which changes very little for small burns:

$$M \sum_i \Delta V_i t_i = M \Delta V_{drift} \to \sum_i f_i^{tangential} \Delta t_i = \Delta P_{drift}$$

$$M \sum_i \Delta V_i (2t_i \cos\lambda_i + r_i \sin\lambda_i) =$$

$$M \Delta V_{K_1} \to \sum_i \left(\begin{array}{c} 2f_i^{tangential}\cos\lambda_i + \\ f_i^{radial}\sin\lambda_i \end{array}\right) \Delta t_i = \Delta P_{K_1}$$

$$M \sum_i \Delta V_i (2t_i \sin\lambda_i + r_i \cos\lambda_i) =$$

$$M \Delta V_{H_1} \to \sum_i \left(\begin{array}{c} 2f_i^{tangential}\sin\lambda_i - \\ f_i^{radial}\cos\lambda_i \end{array}\right) \Delta t_i = \Delta P_{H_1}$$

$$M \sum_i \Delta V_i n_i \cos\lambda_i = M \Delta V_{K_2} \to \sum_i (f_i^{normal}\cos\lambda_i)\Delta t_i = \Delta P_{K_2}$$

$$M \sum_i \Delta V_i n_i \sin\lambda_i = M \Delta V_{H_2} \to \sum_i (f_i^{normal}\sin\lambda_i)\Delta t_i = \Delta P_{H_2}$$

$$\Delta \vec{H} = \sum_i \vec{r}_i \otimes \vec{f}_i \Delta t_i \to \Delta \vec{H} = \sum_i \vec{r}_i \otimes \vec{P}_i$$

There are eight equations above, five for the orbit control and three for the momentum dump. Accordingly, the equations require eight unknowns for their solutions. However, since the orientation of $\Delta H$ (the momentum vector in the orbit frame) varies with orbital position of the spacecraft, closed form solutions to the eight equations above can be found by coupling the momentum dumping with orbit control in specific directions. For example, coupling the momentum dumping with drift control yields the following simple algebraic equations:

$$\sum_i f_i^{tangential} \Delta t_i = \Delta P_{drift}$$

$$\Delta \vec{H} = \sum_i \vec{r}_i \otimes \vec{P}_i$$

And coupling the momentum dumping with inclination control yields the following equations:

$$\sqrt{\Delta P_{H_2}^2 + \Delta P_{K_2}^2} = \Delta P_I$$

$$\sum_i f_i^{normal} \Delta t_i = \Delta P_I$$

$$\Delta \vec{H} = \sum_i \vec{r}_i \otimes \vec{P}_i$$

Either set of equations above requires just four unknowns for their general solutions. For a satellite with fixed thrusters, the unknown can be chosen as the on time of the thrusters. Therefore, the momentum dumping and the selected orbit control can advantageously be accomplished by firing thrusters without the need to mount the thrusters on gimbaled platforms. The momentum dump can be performed in conjunction with drift control, or in conjunction with inclination control, or a combination of both.

By solving for the location of the maneuver, the complete solution for the momentum dumping and inclination control can easily be obtained from the following equations:

$$\sqrt{\Delta P_{K_2}^2 + \Delta P_{H_2}^2} = \Delta P_I$$

$$\lambda_{Inclination} = a\tan2\left(\frac{\Delta P_{H_2}}{\Delta P_I}, \frac{\Delta P_{K_2}}{\Delta P_I}\right)$$

$$\Delta \vec{H} = C_{Orbit\ to\ ECI}^{-1} \Delta \vec{H}_{ECI}$$

$$\sum_i \vec{r}_i \otimes \vec{f}_i \Delta t_i = \Delta \vec{H}$$

$$\sum_i f_i^{normal} \Delta t_i = \Delta P_I$$

where $\Delta \vec{H}$=momentum dumping requirement (vector) in orbit frame $\Delta \vec{H}_{ECI}$=momentum dumping requirement (vector) in Earth—Centered Inertial frame $\Delta P_{K_2}$=spacecraft mass×minimum delta velocity required to control mean $K_2$ $\Delta P_{H_2}$=spacecraft mass×minimum delta velocity required to control mean $H_2$ $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $\lambda_{Inclination}$=location of the maneuver $C_{Orbit\ to\ ECI}$=transformation matrix from orbit to ECI frame,
rotation matrix about the Z by $\lambda_{Inclination}$ $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i = \begin{bmatrix} f_i^{tangential} \\ f_i^{radial} \\ f_i^{normal} \end{bmatrix}$$

Since the maneuver to control the drift is independent of location, the complete solution for the momentum dumping and drift control can be obtained from the following algebraic equations:

$$\sum_i f_i^{tangential} \Delta t_i = \Delta P_{Drift}$$

$$\sum_i \vec{r}_i \otimes \vec{f}_i \Delta t_i = \Delta \vec{H}$$

where $\Delta \vec{H}$=momentum dumping requirement (vector) in orbit frame $\Delta P_{Drift}$=spacecraft mass×minimum delta velocity required to control mean Drift $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $C_{Orbit\ to\ ECI}$=transformation matrix from orbit to ECI frame $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i = \begin{bmatrix} f_i^{tangential} \\ f_i^{radial} \\ f_i^{normal} \end{bmatrix}$$

By placing the drift maneuvers in the locations determined by the drift and eccentricity control equations, the momentum dumping can be performed in conjunction with the eccentricity control. For one maneuver drift and eccentricity control, $\lambda_{Eccentricity}$ can be found by simple iteration (or root searching method) of the following equations:

$$P^{radial} = \sum_i f_i^{radial} \Delta t_i$$

$$\lambda_{Eccentricity} = \tan^{-1}\left(\frac{2\Delta P_{Drift}\Delta P_{H_1} + P^{radial}\Delta P_{K_1}}{2\Delta P_{Drift}\Delta P_{K_1} - P^{radial}\Delta P_{H_1}}\right)$$

$$\Delta \vec{H} = C_{Orbit\ to\ ECI}^{-1} \Delta \vec{H}_{ECI}$$

$$\sum_i \vec{r}_i \otimes \vec{f}_i \Delta t_i = \Delta \vec{H}$$

$$\sum_i f_i^{tangential} \Delta t_i = \Delta P_{Drift}$$

where $\Delta \vec{H}$=momentum dumping requirement (vector) in orbit frame $\Delta \vec{H}_{ECI}$=momentum dumping requirement (vector) in Earth—Centered Inertial frame $\Delta P_{K_1}$=spacecraft mass×minimum delta velocity required to control mean $K_1$ $\Delta P_{H_1}$=spacecraft mass×minimum delta velocity required to control mean $H_1$ $\Delta P_{Drift}$=spacecraft mass×minimum delta velocity required to control mean Drift $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $\lambda_{Eccentricity}$=location of the maneuver $C_{Orbit\ to\ ECI}$=transformation matrix from orbit to ECI frame,
rotation matrix about the Z by $\lambda_{Eccentricity}$ $C_{Body\ to\ Orbit}$=transformation matrix from spacecraft body to orbit frame $$\vec{r}_i = C_{Body\ to\ Orbit} \vec{R}_i$$

$$\vec{f}_i = C_{Body\ to\ Orbit} \vec{F}_i = \begin{bmatrix} f_i^{tangential} \\ f_i^{radial} \\ f_i^{normal} \end{bmatrix}$$

The solution for the two-maneuvers eccentricity control can be used in conjunction with the equation for momentum and drift control to obtain the complete solution for momentum dumping and two maneuvers drift/eccentricity control:

$$\sum_{j=1,2} \overline{f}_j^{radial} \Delta \overline{t}_j = \sum_{j=1,2} P_j^{radial}$$

$$\sum_{j=1,2} \overline{f}_j^{tangential} \Delta \overline{t}_j = \sum_{j=1,2} P_j^{tangential} = \Delta P_{drift}$$

$$(2P_1^{tangential} \cos\lambda_1 + P_1^{radial} \sin\lambda_1) +$$
$$(2P_2^{tangential} \cos(\lambda_1 - \Delta\lambda) + P_2^{radial} \sin(\lambda_1 - \Delta\lambda)) = \Delta P_{K_1}$$

$$(2P_1^{tangential} \sin\lambda_1 - P_1^{radial} \cos\lambda_1) +$$
$$(2P_2^{tangential} \sin(\lambda_1 - \Delta\lambda) - P_2^{radial} \cos(\lambda_1 - \Delta\lambda)) = \Delta P_{H_1}$$

$$-2P_1^{radial} P_2^{radial} \sin\Delta\lambda - 4P_1^{tangential} P_2^{radial} \cos\Delta\lambda -$$
$$8P_1^{tangential} P_2^{tangential} \sin\Delta\lambda + 4P_1^{radial} P_2^{tangential} \cos\Delta\lambda = 0$$

$$\lambda_2 = \lambda_1 - \Delta\lambda$$

$$\Delta \overline{H}_{ECI} = \sum_j \Delta \overline{H}_{ECI,j}$$

$$\Delta \overline{H}_j = C_{Orbit\ to\ ECI}^{-1}(\lambda_j) \Delta \overline{H}_{ECI,j}$$

$$\sum_i f_{i,j}^{tangential} \Delta t_{i,j} = P_j^{tangential}$$

$$\sum_i \overline{r}_{i,j} \otimes \overline{f}_{i,j} \Delta t_{i,j} = \Delta \overline{H}_j$$

$$\overline{r}_{i,j} = C_{Body\ to\ Orbit} \overline{R}_{i,j}$$

$$\overline{f}_{i,j} = C_{Body\ to\ Orbit} \overline{F}_{i,j} = \begin{bmatrix} f_{i,j}^{tangential} \\ f_{i,j}^{radial} \\ f_{i,j}^{normal} \end{bmatrix}$$

$j = 1, 2$ index for the maneuvers $i$ = index for the $i^{th}$ thruster

The four sets of equations above (momentum dumping and inclination control; momentum dumping and drift control; one maneuver drift and eccentricity control; and two maneuvers drift and eccentricity control) can be performed independently, or in various combinations with one another. Example combinations include momentum dumping and inclination control with one maneuver drift and eccentricity control, and momentum dumping and inclination control with two maneuvers drift and eccentricity control. Under certain circumstances, momentum dumping and drift control may be performed independently in order to maintain the satellite's longitude. For orbits that do not require control of inclination, such as, for example, satellites designed for geo-mobile communications, either one maneuver drift and eccentricity control or two maneuvers drift and eccentricity control may be used to control the orbit drift and eccentricity.

Using the equations described above for simultaneous momentum dumping and orbit control, substantial benefits can be achieved. For example, the number of maneuvers needed to maintain station can be reduced. Also, station-keeping maneuvers can be performed with a single burn. Each of these benefits contributes to increased efficiency in propellant usage, which in turn extends the satellite's lifespan. If desired, single station-keeping maneuvers can be broken into segments, or pulses, which can be spaced out over multiple burns. In such embodiments, the pulses can be separated by lesser time intervals as compared to prior art methods. For example, the elapsed time between pulses may be on the order of minutes, rather than hours, and may even be less than one minute.

The present system and methods also enable tighter orbit control, which has the added benefit of reducing the antenna pointing budget. Because station-keeping maneuvers can be performed with single burns, or with closely spaced pulsed burns, transients are reduced. The satellite is thus more likely to be on station, even between pulses. Station-keeping maneuvers can also be performed with a reduced number of station-keeping thrusters aboard the satellite. For example, some maneuvers can be performed with as little as three or four thrusters.

The present methods also eliminate the need for the thrusters to point through the center of mass of the satellite, which in turn reduces the need for dedicated station-keeping thrusters. In certain embodiments, however, some thrusters may point through the center of mass. The present methods can also be performed with thrusters that are not pivotable with respect to the satellite, which reduces the complexity and cost of the satellite. In certain embodiments, however, some or all thrusters may be pivotable with respect to the satellite. For example, the thrusters may be mounted on gimbaled platforms.

The present system and methods of simultaneous momentum dumping and orbit control also facilitate completely autonomous orbit and ACS control. Satellites are typically controlled from Earth, with station-keeping commands transmitted from Earth to the satellite. The present methods, however, facilitate elimination of the Earth-bound control center. The satellite itself may monitor its position and trajectory, generate station-keeping commands on board, and execute the commands, all without the need for any intervention from Earth.

While the system and methods above have been described as having utility with geosynchronous satellites, those of ordinary skill in the art will appreciate that the present system and methods may also be used for orbit control and momentum dumping in satellites in non-geosynchronous circular and near circular orbits. For example, the present system and methods may also be used for satellites in non-geosynchronous low Earth orbit (altitude from approximately 100 km to approximately 2,000 km) and/or medium Earth orbit (altitude from approximately 3,000 km to approximately 25,000+ km).

The above description presents the best mode contemplated for carrying out the present system and methods for simultaneous momentum dumping and orbit control, and of the manner and process of making and using them, in such full, clear, concise, and exact terms as to enable any person skilled in the art to which they pertain to make this system and use these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A method of simultaneous orbit control and momentum dumping in a spacecraft, the spacecraft including a plurality of thrusters, the method comprising the steps of:
   generating a first set of firing commands for the thrusters from solutions to momentum dumping and drift control equations; and firing the thrusters according to the first set of firing commands, wherein the momentum dumping and drift control equations for the first set of firing commands are defined as $$\Delta \vec{H} = \sum_i \vec{r}_i \otimes \vec{f}_i \Delta t_i$$

$$\sum_i f_i^{tangential} \Delta t_i = \Delta P_{Drift};$$

where $\Delta \vec{H}$=momentum dumping requirement (vector) in orbit frame $\Delta P_{Drift}$=spacecraft mass×minimum delta velocity required to control mean Drift $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $C_{Orbit\ to\ ECI}$=transformation matrix from orbit to ECI frame $C_{Body\ to\ Orbit}$=transformation matrix from spacecraft body to orbit frame $\vec{r}_i = C_{Body\ to\ Orbit} \vec{R}_i$ $$\vec{f}_i = C_{Body\ to\ Orbit} \vec{F}_i = \begin{bmatrix} f_i^{tangential} \\ f_i^{radial} \\ f_i^{normal} \end{bmatrix}$$

and wherein the method further comprises the step of:
generating a second set of firing commands for the thrusters from solutions to momentum dumping/drift and eccentricity control equations, wherein the momentum dumping/drift and eccentricity control equations are defined as $$P^{tangential} = \sum_i f_i^{tangential} \Delta t_i$$

$$P^{radial} = \sum_i f_i^{tangential} \Delta t_i$$

$$\lambda_{Eccentricity} = \tan^{-1} \left( \frac{2 P^{tangential} \Delta P_{H_1} + P^{radial} \Delta V_{K_1}}{2 P^{tangential} \Delta P_{K_1} - P^{radial} \Delta V_{H_1}} \right)$$

$$\Delta \vec{H}_{ECI} = C_{Orbit\ to\ ECI} \Delta \vec{H}$$

$$\Delta \vec{H} = \sum_i \vec{r}_i \otimes \vec{f}_i \Delta t_i$$

$$\sum_i f_i^{tangential} \Delta t_i = \Delta P_{Drift};$$

where $\vec{H}$=momentum dumping requirement (vector) in orbit frame $\Delta \vec{H}_{ECI}$=momentum dumping requirement (vector) in Earth—Centered Inertial frame $\Delta P_{K_1}$=spacecraft mass×minimum delta velocity required to control mean $K_1$ $\Delta P_{H_1}$=spacecraft mass×minimum delta velocity required to control mean $H_1$ $\Delta P_{Drift}$=spacecraft mass×minimum delta velocity required to control mean Drift $\vec{R}_i$=lever arm (vector) about the c.g. for the $i^{th}$ thruster in spacecraft body frame $\vec{F}_i$=thrust vector for the $i^{th}$ thruster in spacecraft body frame $\Delta t_i$=on time for the $i^{th}$ thruster $\lambda_{Eccentricity}$=location of the maneuver $C_{Orbit\ to\ ECI}$=transformation matrix from orbit to ECI frame,
rotation matrix about the Z by $\lambda_{Eccentricity}$ $C_{Body\ to\ Orbit}$=transformation matrix from spacecraft body to orbit frame $\vec{r}_i = C_{Body\ to\ Orbit} \vec{R}_i$ $$\vec{f}_i = C_{Body\ to\ Orbit} \vec{F}_i = \begin{bmatrix} f_i^{tangential} \\ f_i^{radial} \\ f_i^{normal} \end{bmatrix}.$$

2. The method of claim 1, wherein the thrusters are fired according to the first and second sets of firing commands simultaneously.

3. The method of claim 1, wherein the solutions result in either under correction or over correction of the eccentricity, and wherein the method further comprises:
correcting a difference in a next control cycle.

4. The method of claim 1 further comprising:
firing the thrusters according to the firing commands to perform completely autonomous orbit and attitude control system control.

5. The method of claim 1 further comprising:
finding a closed form solution to the momentum dumping and drift control equations by coupling momentum dumping with orbit control in specified directions.

6. The method of claim 1 further comprising:
performing a momentum dump.

7. The method of claim 6 further comprising:
performing the momentum dump in conjunction with drift control.

8. The method of claim 6 further comprising:
performing the momentum dump in conjunction with inclination control.

9. The method of claim 6 further comprising:
performing the momentum dump in conjunction with both drift control and inclination control.

10. The method of claim 1 further comprising:
performing the momentum dump in conjunction with eccentricity control.

11. The method of claim 1 further comprising:
performing momentum dumping and drift control independently to maintain a longitude of the spacecraft.

12. The method of claim 1 further comprising:
performing station-keeping maneuvers in pulses spaced out over multiple burns, wherein an elapsed time between the pulses comprises about a second to about minutes.

13. A method of simultaneous orbit control and momentum dumping in a spacecraft, the spacecraft including a plurality of thrusters, the method comprising the steps of:
generating a first set of firing commands for the thrusters from solutions to momentum dumping and drift control equations; and firing the thrusters according to the first set of firing commands, wherein the momentum dumping and drift control equations for the first set of firing commands are defined as $$\Delta \vec{H} = \sum_i \vec{r}_i \otimes \vec{f}_i \Delta t_i$$

$$\sum_i f_i^{tangential} \Delta t_i = \Delta P_{Drift};$$

where $\Delta \vec{H}$=momentum dumping requirement (vector) in orbit frame
$\Delta P_{Drift}$=spacecraft mass×minimum delta velocity required to control mean Drift
$\vec{R}_i$=lever arm (vector) about the c.g. for the $i^{th}$ thruster in spacecraft body frame
$\vec{F}_i$=thrust vector for the $i^{th}$ thruster in spacecraft body frame
$\Delta t_i$=on time for the $i^{th}$ thruster
$C_{Orbit\ to\ ECI}$=transformation matrix from orbit to ECI frame
$C_{Body\ to\ Orbit}$=transformation matrix from spacecraft body to orbit frame
$\vec{r}_i = C_{Body\ to\ Orbit} \vec{R}_i$ $$\vec{f}_i = C_{Body\ to\ Orbit} \vec{F}_i = \begin{bmatrix} f_i^{tangential} \\ f_i^{radial} \\ f_i^{normal} \end{bmatrix}$$

and wherein the method further comprises the step of:
generating a second set of firing commands for the thrusters from solutions to momentum dumping/drift and eccentricity control equations wherein the momentum dumping/drift and eccentricity control equations are defined as $$\sum_{j=1,2} P_j^{tangential} = \Delta P_{drift}$$

$(2P_1^{tangential}\cos\lambda_1 + P_1^{radial}\sin\lambda_1) +$
$\qquad (2P_2^{tangential}\cos(\lambda_1 - \Delta\lambda) + P_2^{radial}\sin(\lambda_1 - \Delta\lambda)) = \Delta P_{K_1}$
$(2P_1^{tangential}\sin\lambda_1 - P_1^{radial}\cos\lambda_1) +$
$\qquad (2P_2^{tangential}\sin(\lambda_1 - \Delta\lambda) - P_2^{radial}\cos(\lambda_1 - \Delta\lambda)) = \Delta P_{H_1}$
$-2P_1^{radial} P_2^{radial}\sin\Delta\lambda - 4P_1^{tangential} P_2^{radial}\cos\Delta\lambda -$
$\qquad 8P_1^{tangential} P_2^{tangential}\sin\Delta\lambda + 4P_1^{radial} P_2^{tangential}\cos\Delta\lambda = 0$ $\lambda_2 = \lambda_1 - \Delta\lambda$ $\Delta \vec{H}_{ECI} = \Delta \vec{H}_{ECI,1} + \Delta \vec{H}_{ECI,2}$ $\Delta \vec{H}_{ECI,1} = C_{Orbit\ to\ ECI}(\lambda_1) \Delta \vec{H}_1$ $\Delta \vec{H}_{ECI,2} = C_{Orbit\ to\ ECI}(\lambda_2) \Delta \vec{H}_2$ $P_j^{radial} = \sum_i f_{i,j}^{radial} \Delta t_{i,j}$ $P_j^{tangential} = \sum_i f_{i,j}^{tangential} \Delta t_{i,j}$ $\Delta \vec{H}_j = \sum_i \vec{r}_{i,j} \otimes \vec{f}_{i,j} \Delta t_{i,j};$ where $\vec{r}_{i,j} = C_{Body\ to\ Orbit} \vec{R}_{i,j}$ $$\vec{f}_{i,j} = C_{Body\ to\ Orbit} \vec{F}_{i,j} = \begin{bmatrix} f_{i,j}^{tangential} \\ f_{i,j}^{radial} \\ f_{i,j}^{normal} \end{bmatrix}$$

$j = 1, 2$
$i$ = index for the $i^{th}$ thruster.

14. The method of claim 13, wherein the thrusters are fired according to the first and second sets of firing commands simultaneously.

15. A method of simultaneous orbit control and momentum dumping in a spacecraft, the spacecraft including a plurality of thrusters, the method comprising the steps of:
generating a set of firing commands for the thrusters from solutions to momentum dumping/drift and eccentricity control equations; and
firing the thrusters according to the firing commands;
wherein the momentum dumping/drift and eccentricity control equations are defined as $$P^{tangential} = \sum_i f_i^{tangential} \Delta t_i$$

$$P^{radial} = \sum_i f_i^{radial} \Delta t_i$$

$$\lambda_{Eccentricity} = \tan^{-1}\left(\frac{2P^{tangential}\Delta P_{H_1} + P^{radial}\Delta V_{K_1}}{2P^{tangential}\Delta P_{K_1} - P^{radial}\Delta V_{H_1}}\right)$$

$\Delta \vec{H}_{ECI} = C_{Orbit\ to\ ECI} \Delta \vec{H}$ $\Delta \vec{H} = \sum_i \vec{r}_i \otimes \vec{f}_i \Delta t_i$ $\sum_i f_i^{tangential} \Delta t_i = \Delta P_{Drift};$ where $\Delta \vec{H}$=momentum dumping requirement (vector) in orbit frame
$\Delta \vec{H}_{ECI}$=momentum dumping requirement (vector) in Earth—Centered Inertial frame
$\Delta P_{K_1}$=spacecraft mass×minimum delta velocity required to control mean $K_1$
$\Delta P_{H_1}$=spacecraft mass×minimum delta velocity required to control mean $H_1$
$\Delta P_{Drift}$=spacecraft mass×minimum delta velocity required to control mean Drift
$\vec{R}_i$=lever arm (vector) about the c.g. for the $i^{th}$ thruster in spacecraft body frame
$\vec{F}_i$=thrust vector for the $i^{th}$ thruster in spacecraft body frame
$\Delta t_i$=on time for the $i^{th}$ thruster
$\lambda_{Eccentricity}$=location of the maneuver
$C_{Orbit\ to\ ECI}$=transformation matrix from orbit to ECI frame,
rotation matrix about the Z by $\lambda_{Eccentricity}$
$C_{Body\ to\ Orbit}$=transformation matrix from spacecraft body to orbit frame
$\vec{r}_i = C_{Body\ to\ Orbit} \vec{R}_i$ $$\vec{f}_i = C_{Body\ to\ Orbit} \vec{F}_i = \begin{bmatrix} f_i^{tangential} \\ f_i^{radial} \\ f_i^{normal} \end{bmatrix}.$$

16. A method of simultaneous orbit control and momentum dumping in a spacecraft, the spacecraft including a plurality of thrusters, the method comprising the steps of:
    generating a set of firing commands for the thrusters from solutions to momentum dumping/drift and eccentricity control equations; and
    firing the thrusters according to the firing commands;
    wherein the momentum dumping/drift and eccentricity control equations are defined as $$\sum_{j=1,2} P_j^{tangential} = \Delta P_{drift}$$

$$(2P_1^{tangential}\cos\lambda_1 + P_1^{radial}\sin\lambda_1) + (2P_2^{tangential}\cos(\lambda_1 - \Delta\lambda) + P_2^{radial}\sin(\lambda_1 - \Delta\lambda)) = \Delta P_{K_1}$$

$$(2P_1^{tangential}\sin\lambda_1 - P_1^{radial}\cos\lambda_1) + (2P_2^{tangential}\sin(\lambda_1 - \Delta\lambda) - P_2^{radial}\cos(\lambda_1 - \Delta\lambda)) = \Delta P_{H_1}$$

$$-2P_1^{radial}P_2^{radial}\sin\Delta\lambda - 4P_1^{tangential}P_2^{radial}\cos\Delta\lambda - 8P_1^{tangential}P_2^{tangential}\sin\Delta\lambda + 4P_1^{radial}P_2^{tangential}\cos\Delta\lambda = 0$$

-continued $$\lambda_2 = \lambda_1 - \Delta\lambda$$

$$\Delta\vec{H}_{ECI} = \Delta\vec{H}_{ECI,1} + \Delta\vec{H}_{ECI,2}$$

$$\Delta\vec{H}_{ECI,1} = C_{Orbit\ to\ ECI}(\lambda_1)\Delta\vec{H}_1$$

$$\Delta\vec{H}_{ECI,2} = C_{Orbit\ to\ ECI}(\lambda_2)\Delta\vec{H}_2$$

$$P_j^{radial} = \sum_i f_{i,j}^{radial}\Delta t_{i,j}$$

$$P_j^{tangential} = \sum_i f_{i,j}^{tangential}\Delta t_{i,j}$$

$$\Delta\vec{H}_j = \sum_i \vec{r}_{i,j} \otimes \vec{f}_{i,j}\Delta t_{i,j};$$

where $$\vec{r}_{i,j} = C_{Body\ to\ Orbit}\vec{R}_{i,j}$$

$$\vec{f}_{i,j} = C_{Body\ to\ Orbit}\vec{F}_{i,j} = \begin{bmatrix} f_{i,j}^{tangential} \\ f_{i,j}^{radial} \\ f_{i,j}^{normal} \end{bmatrix}$$

$j = 1, 2$ $i$ = index for the $i^{th}$ thruster.

\* \* \* \* \*